United States Patent [19]
Hale et al.

[11] 3,939,949
[45] Feb. 24, 1976

[54] HYDRAULIC SYSTEM FOR BRAKING TRUCK ENGINES

[76] Inventors: John D. Hale; Frank L. Hale, both of P.O. Box 11, Swisshome, Oreg. 97480; Samuel J. Hale, Jr., Star Rte., Box 33, Chesire, Oreg. 97419

[22] Filed: Jan. 24, 1975

[21] Appl. No.: 543,802

[52] U.S. Cl............................. 192/3 TR; 188/290
[51] Int. Cl.² ........................................ F16D 57/02
[58] Field of Search .......... 192/3 TR, 3 R; 188/290, 188/292, 293, 294

[56] References Cited
UNITED STATES PATENTS

| | | | |
|---|---|---|---|
| 1,710,032 | 4/1929 | Price | 192/3 R |
| 2,521,593 | 9/1950 | McNutt | 192/3 TR |
| 2,723,010 | 11/1955 | Stelmack | 192/3 TR X |
| 2,758,684 | 8/1956 | Stickel | 192/3 R |

*Primary Examiner*—Benjamin W. Wyche
*Attorney, Agent, or Firm*—James D. Givnan, Jr.

[57] ABSTRACT

An energy absorbing system operable in conjunction with a pump powered off of the vehicle drive train, the system including a driver control panel including a settable relief valve permitting control of remote pilot operated relief valves for variable loading of the pump for vehicle braking purposes. Pump discharge is by-passed around the driver control relief valve during open throttle conditions while conversely a closed throttle position, during deceleration, will automatically close the by-pass to subject pump output to variable loading by the operator controlled relief valve. Additionally, manually operated control valves assure system operation in the event of component failure.

5 Claims, 2 Drawing Figures

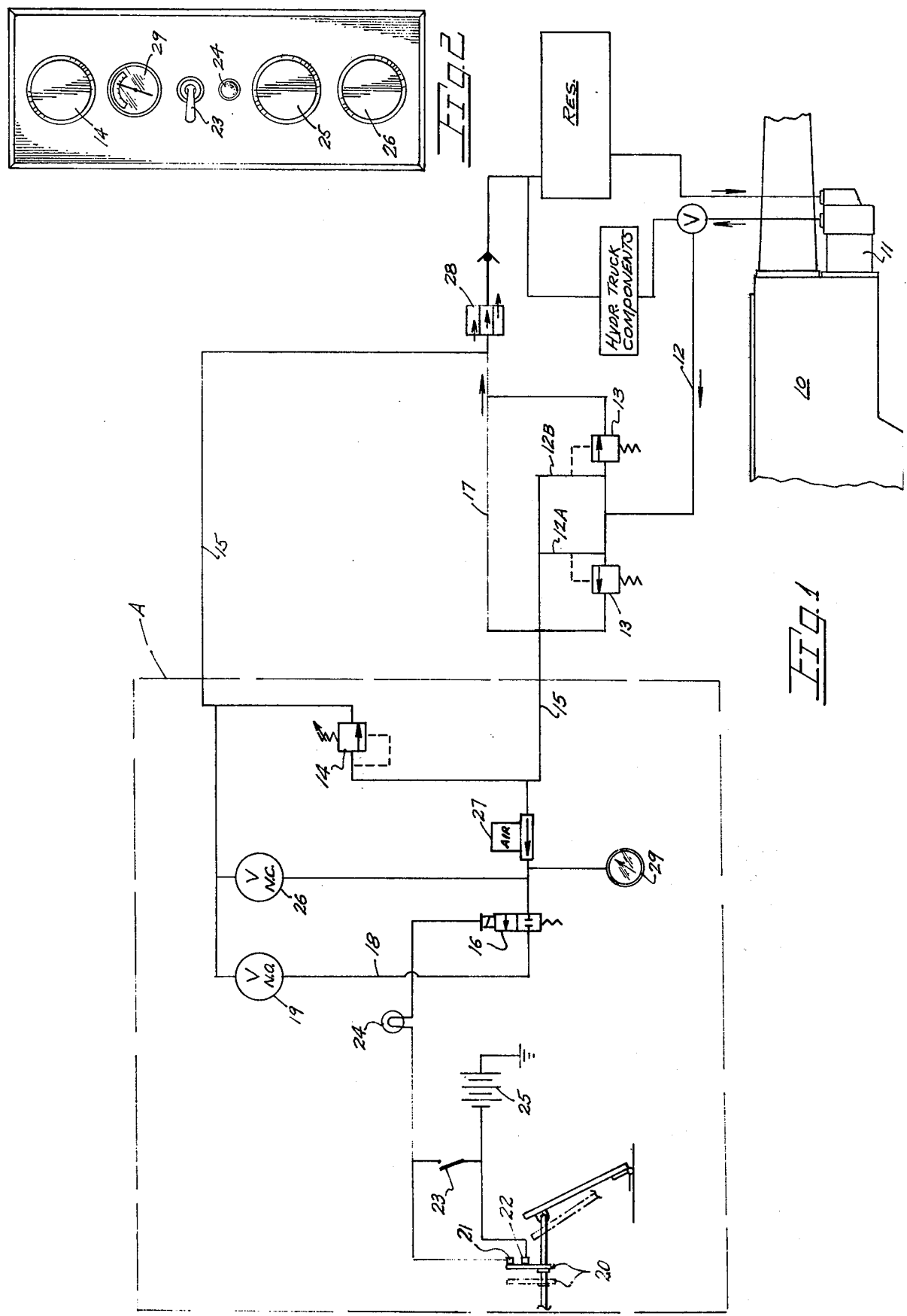

HYDRAULIC SYSTEM FOR BRAKING TRUCK ENGINES

BACKGROUND OF THE INVENTION

The present invention concerns a hydraulic system for selectively loading a hydraulic pump to absorb driveline energy of a vehicle to brake same. The broad concept of utilizing hydraulic pumps and the like to absorb energy from a vehicle driveline is well known as evidenced by U.S. Pat. No. 3,759,355 granted to the present inventor with other hydraulic braking systems being disclosed in U.S. Pat. Nos. 2,905,276; 3,185,261; and 3,593,828.

The systems disclosed in the earlier patents are not intended for use with pump means now often included as a standard transmission component in certain types of heavy duty trucks. Normally such power take-off pumps are in splined engagement with a truck transmission component and are used for powering hydraulic components such as, for example, the hydraulic rams of a truck having a tiltable dump body.

A further disadvantage to known systems is the lack of back up safety provisions and limited driver control of the system. Driver control is limited, for the most part, to either an "on" or "off" condition of the energy absorbing system.

SUMMARY OF THE INVENTION

The present hydraulic braking system includes pilot operated relief valve means, the pilot operating pressure of which is subjected to driver control permitting continuous regulation of the system to suit road conditions.

The present energy absorbing system relies on a source of fluid pressure driven as a power take-off unit of the vehicle's transmission. In most instances, the pressure source may be a pump provided as original equipment on the vehicle for the purpose of powering hydraulic truck components. Pump discharged fluid is cycled through a normally open solenoid valve which is closeable upon closing of the throttle. The pump is accordingly loaded to the set point of a driver regulated relief valve which allows partial unloading of the system. Additional valve components and controls of the system are accessible to the driver on a panel adjacent the driver's station to allow manual adjustment of certain of the system valves in the event of component or electrical failure. Pilot operated relief valves are operable to protect the system from excessive pressures. Means are provided to protect the system against fluid shock loads.

BRIEF DESCRIPTION OF THE DRAWING

In the accompanying drawing:

FIG. 1 is a hydraulic schematic of the present system, and

FIG. 2 is a plan view of a typical control panel in the driver's compartment.

DETAILED DESCRIPTION OF THE PREFERRED EMBODIMENT

With continuing reference to the accompanying drawing wherein applied reference numerals indicate parts similarly identified in the following specification the reference numeral 10 identifies a transmission case in a truck driveline, the transmission being of the type currently found on heavy duty trucks and particularly those types of trucks having hydraulic powered accessories.

Indicated at 11 is a positive displacement hydraulic pump suitably mounted on the transmission case and driven by a power take-off component integral with the transmission. A pressure or output line 12 communicates pump 11 with a pair of relief valves 13 each being pilot operated and opening at a pre-set pressure occurring in branches 12A—12B of conduit 12. A driver adjustable relief valve at 14 is served by a line 15. Driver settable relief is located within a driver compartment outlined at A, and permits driver adjustment of same while under way as later elaborated upon. A desirable operating range for relief valve 14 is from 0 through 2,500 PSI. Valve 14 is of the pilot operated type but hereinafter referred to as a driver settable relief valve.

A solenoid actuated valve is indicated at 16 in a by-pass line 18 which valve, upon closing, blocks the low pressure circulation of hydraulic fluid through conduit 15 and by-pass 18. A manually actuated valve 19 provides a backup shut-off in by-pass 18 in the event of solenoid valve malfunction. Solenoid valve 16 is in circuit with and automatically energized by means of a throttle operated switch 20 having contacts 21 and 22, one of which is in circuit with a source 25, and closeable upon the throttle being backed off to a closed position. A manual "ON-OFF" switch at 23 provides the driver with additional control over solenoid valve 16. A system ON-OFF light is indicated at 24. A normally closed valve at 26 may be manually opened in the event solenoid valve fails in a closed position to permit by-passing of same. An accumulator at 27 is pre-charged to receive fluid and avert fluid shock to conduit 15 upon closure of by-pass line 18.

In operation, the power take-off component in transmission 10 is driven during deceleration by the drive wheels of the vehicle at a speed proportional with the transmission tail shaft. A low pressure flow of fluid passes through conduit 12, conduit 15 and by-pass line 18 for return to reservoir R. A heat exchanger 28 cools the fluid during return to the reservoir.

Braking is initiated by automatic closure of solenoid valve 16 resulting from closure of an electrical circuit through throttle closed contacts 21 and 22 or, alternatively, manually actuated switch 23 whereupon a buildup of fluid pressure occurs in conduit 15 to the set point of driver settable relief valve 14. Accumulator 27 cushions against fluid shock occurring in conduit 15. Pressure buildup in line 15 beyond the set point of valve 14 is relieved by fluid being routed through pilot operated relief valves 13 and line 17 past heat exchanger 28 to reservoir R. Multiple relief valves 13 are shown, however a single valve 13 may be utilized depending on valve capacity and system requirements. Back pressue in communicating conduits 12 and 15 will exert a loading effect on pump 11 and hence the drive line. During system operation a pressure indicator may be monitored by the driver to assure system pressure being kept within safe limits.

While we have shown but one embodiment of the invention it will be apparent to those skilled in the art that the invention may be embodied still otherwise without departing from the spirit and scope of the invention.

Having thus described the invention what is desired to be secured under a Letters Patent is:

1. An energy absorbing system for a vehicle drive train of the type having a power take-off pump associated therewith, said system comprising,
   a control panel for said system located at the driver's station, said control panel including a driver settable relief valve in fluid communication with said pump, a system pressure indicator,
   a relief valve by-pass line,
   a solenoid actuated valve in the relief valve by-pass line operable in a closed position to divert pump output through said relief valve,
   switch means in circuit with said solenoid valve and operable to close said solenoid valve during vehicle deceleration, and
   pilot operated relief valve means in communication with the power take-off pump, said relief valve means having its pilot in fluid communication with said pump and also with the driver controlled relief valve whereby upon closure of the by-pass line by said solenoid during vehicle deceleration the build up of fluid pressure acting on the pilot may be regulated by adjustment of the driver operated relief valve which in turn regulates the opening and closing of the pilot operated relief valve means to affect loading of the power take-off pump for energy absorbing purposes.

2. The energy absorbing system as claimed in claim 1 additionally including a normally open valve and a normally closed valve disposed in parallel in said relief valve by-pass line.

3. The energy absorbing system as claimed in claim 2 wherein said switch means is actuated by the vehicle throttle moving to a closed position.

4. The energy absorbing system as claimed in claim 1 wherein said control panel additionally includes a driver actuated switch in parallel with said switch means for alternative closing of the circuit to said solenoid actuated valve.

5. The energy absorbing system as claimed in claim 1 additionally including a pre-charged accumulator in the by-pass line to avoid fluid shock to the system.

* * * * *